US006893520B2

(12) United States Patent
Cummings et al.
(10) Patent No.: US 6,893,520 B2
(45) Date of Patent: May 17, 2005

(54) METHOD AND APPARATUS FOR SYNCHRONIZING END OF ORDER CUTOFF FOR A PLUNGE SLIT ORDER CHANGE ON A CORRUGATOR

(75) Inventors: James A. Cummings, Phillips, WI (US); Richard F. Paulson, Phillips, WI (US); Shayne A. Roberts, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 192 days.

(21) Appl. No.: 10/356,152

(22) Filed: Jan. 31, 2003

(65) Prior Publication Data

US 2004/0149378 A1 Aug. 5, 2004

(51) Int. Cl.[7] .................................... B32B 31/18

(52) U.S. Cl. ..................... 156/64; 156/210; 156/269; 156/271; 156/353; 83/408

(58) Field of Search ..................... 156/64, 210, 250, 156/259, 267, 268, 269, 270, 271, 353, 470, 510, 523; 83/408, 425.1

(56) References Cited

U.S. PATENT DOCUMENTS

| | | | |
|---|---|---|---|
| 4,289,052 A | 9/1981 | Woolston et al. | |
| 4,415,978 A | 11/1983 | Craemer et al. | |
| 4,976,676 A | 12/1990 | Mensing et al. | |
| 5,152,205 A | 10/1992 | Yoshida et al. | |
| 5,286,317 A | 2/1994 | Treat et al. | |
| 5,393,294 A | 2/1995 | Jobst et al. | |
| 5,496,431 A | 3/1996 | Hirakawa et al. | |
| 5,857,395 A | 1/1999 | Böhm | |
| 5,927,170 A | 7/1999 | Grill et al. | |
| 6,022,017 A | 2/2000 | Cummings et al. | |
| 6,092,452 A | 7/2000 | Adami | |
| 6,117,381 A | 9/2000 | Cummings | |
| 6,568,304 B2 * | 5/2003 | Ito et al. | 83/13 |
| 6,684,749 B2 * | 2/2004 | Adami | 83/408 |

FOREIGN PATENT DOCUMENTS

| | | |
|---|---|---|
| DE | 44 25 155 | 7/1994 |
| GB | 2 037 714 | 11/1979 |
| GB | 2 060 575 | 10/1980 |
| JP | 8-91679 | 9/1996 |

* cited by examiner

*Primary Examiner*—James Sells
(74) *Attorney, Agent, or Firm*—Andrus, Sceales, Starke & Sawall, LLP

(57) ABSTRACT

A system is provided for synchronizing the end of order cutoff for a plunge slit order change on a corrugator that minimizes scrap and cuts the end order sheets to a length and width such that jam-ups at order change are eliminated. The system detects a transverse edge discontinuity immediately prior to end of order cutoff and, in conjunction with a prior calculation comparing sheet lengths and order end positions between upper and lower webs, positions an upstream transverse partial web slit at an optimum order end position such that the entire web is ultimately cut on the partial sever at an optimum position for scrap minimization and scrap sheet size and shape.

16 Claims, 6 Drawing Sheets

METHOD AND APPARATUS FOR SYNCHRONIZING END OF ORDER CUTOFF FOR A PLUNGE SLIT ORDER CHANGE ON A CORRUGATOR

BACKGROUND OF THE INVENTION

The present invention pertains to a means of synchronizing the rotary shear and cutoff at order change in the dry end conversion of a corrugated web. In particular, the invention relates to a method for achieving a continuous web order change with the associated order change waste minimized and cut and slit so as to reduce potential for jam-up as it exits the cutoff knife into a stacking system.

In a corrugator dry end, where a corrugated paperboard web is longitudinally scored and slit into multiple parallel output webs (or "outs"), the outs are directed through one or more downstream cutoff knives which cut the output webs into selected sheet lengths. When two cutoff knives are used, they are vertically separated and each is capable of cutting the full corrugator width web. A web selector positioned downstream of the slitter/scorer divides the outs into two groups, one of which is directed to the upper cutoff knife and the other to the lower cutoff knife. Order changes must be effected while the upstream corrugator wet end continues to produce and deliver the continuous web to the slitter/scorer. An order change will typically result in a change in widths of the output webs, requiring redirection of at least a central portion of the web from one knife level to the other and possibly changes in edge trim widths as well.

The prior art has developed a gapless or plunge-style order change for corrugated dry ends utilizing double level cutoff knives. In this system, there are two slitter/scorer stations immediately adjacent to one another in the direction of web movement and through both of which the web travels. At order change, one slitter/scorer, operating on the currently running order, will lift out of operative engagement with the web, and the other slitter/scorer, which is set to the new order alignment, plunges down into operative engagement with the web. The result is a small order change region of corrugated web with overlapping slits and scores.

To effectuate such a gapless order change, a means must be provided to accommodate redirection of the central portion of the web in the web selector device from one knife level to the other. In U.S. Pat. No. 5,496,431, a laterally adjustable cutting tool, positioned over the center of the web, makes a cut in the order change region connecting the inner-most slit in the currently running order to the inner-most slit in the new order to allow a repositioning of the web directing forks in the web selector device.

In one embodiment of the above identified patent, the inner-most slits on the old and new orders are connected by a running diagonal cut to provide smooth transition in the output webs directed to the upper and lower cutoff knives. With this concept, there is a requirement to have overlapping slits on the outer edges of the web to allow straight lateral cut across the slits for a trim width change. Internal slits can be offset in the order change region in the running web direction, or overlapped. If the slits are offset, then the width of the scrap piece emerging from the cutoff knife may be wider than the individual outs on one level of the knife, creating a problematic situation upon discharge of the stack form that level. If the slits are overlapped, then there is potential for creation of small pieces, some of which have diagonal cuts that may not fit nicely on top of the stack onto which the cut sheets are directed.

In another embodiment of the above identified patent, the innermost slits of the old and new orders are connected by a lateral cut that requires the overlap of the innermost slits. By overlapping all slits, it is possible that the scrap associated with the order change region will emerge from the cutoff knife slit to the width of the old order sheets and a length shorter than the old order sheets so that these sheets are simply discharged into the top of the last stack in the old order, where they can be removed by the operator. Unfortunately, it is equally likely that several small odd-sized pieces may be created that will not have a stack to land on and that create high probability of a stacker jam-up. By only overlapping the innermost slits to create an opportunity for redirection of the webs at the web selector table and by controlling the cutoff knife to stop cutting prior to the order change region in the old order and after the order change region has passed on the new order it is possible to avoid the creation of small odd-sized pieces. The scrap piece created with this technique is typically larger than the sheets cut on the expiring order. In this case, the order change region scrap will not fit onto the top of the stack unless the stacker backstop is backed away when the scrap piece enters the stacker. This is problematic in that moving the backstop away to accommodate the long scrap sheet can allow sheets to cascade off the top of the stack onto the stacker lift.

To solve problems associated with order change region scrap removal, diverter systems have been installed after the cutoff knife. These knife diverters have been problematic because the space between cutoff knife levels constrains the distance between top and bottom knife diverters, making jam clearing very difficult. Diverting small pieces, some of which may have diagonal cuts, is also very challenging.

Another means of achieving a gapless order change while accommodating redirection of the central portion of the web in the web slitter device from one level to the other using a plunge slitter/scorer with two slitter/score stations is taught in U.S. Pat. No. 6,137,381. In this patent, a means of partially severing transversely across the web at a position prior to the slitter/scorer is utilized. The partial web sever is comprised of a transverse slit extending inwardly from one lateral edge that severs at least a portion of the web representative of the larger of the total width of the running and new order widths of one of the upper or lower output web portions. The innermost running order and new order output webs of the other of said upper and lower output web portions remain at least partially uncut by said transverse slit.

The partial web sever order change will result in that portion of the old order web that is cut by the transverse slit to accelerate away from the new order due to cutoff knife overspeed as soon as the transverse slit exits the slitter/scorer. This old order output web will be of the exact width of the expiring order and will be cut to length with the exception of a short tail scrap piece that will fit onto the top of the stack. The output web that has not been severed may have a change in the number and width of the outs from the old order to the new order. To prevent a small piece of scrap from being created at the end of the last cuts in the old order on this web, the cutoff knife must be biased to cut upstream of the transverse cut on this last cut of the old order. This approach prevents a short scrap piece from being created that may jam up. When doing this, a sheet is created with a leading edge that is not square under certain circumstances. This can also cause a jam-up at the stacker.

SUMMARY OF THE INVENTION

In accordance with the present invention, a means of synchronizing the placement of the partial web sever in accordance with U.S. Pat. No. 6,117,381 relative to the cuts of the old order outs and the subsequent sensing of the web sever on the continuous web portion of the order change allows all of the scrap associated with the order change region to be slit to the exact width of the old order outs and cut to length that will fit on the top of the stack of the old order outs. The method of the present invention utilizes a shear apparatus that creates the transverse slit for the partial web sever order change based upon an algorithm that first places the web sever relative to the last cut in the order in the unsevered portion of the web such that the partial web sever lies within a distance greater than or equal to the maximum reaction of the cutoff knife profile controller (normally 18 inches) from the end of the order. This insures that a high-speed photo eve that is pre-positioned cross-corrugator to sense the web width change portion created by the partial web sever is able to provide a signal to the knife controller that allows the knife to cut on the web sever position to within very close accuracy.

Having determined that the partial web sever will be so positioned, the actual position of the partial web sever will then be chosen to correspond to the exact end of the order of the web portion associated with the shear sever. This approach will insure that the knife in the level with the continuous web will be able to synchronize upon width change sense to the end of the order and the level with web sever will be able to end the order upon the exact length of the sheets being cut. The result of this partial web sever shear and knife synchronization is that all of the order change segment scrap will be able to fit onto the top of the stack slit to the width of the outs on the level with the continuous web and the order with the partial web sever will also be slit to width and cut to the exact length of the sheets being cut on that level. The first sheets in the new order on both levels will normally have overlapping slits, making them scrap sheets. These sheets will protect the bottom of this stack and are normally considered scrap sheets at any rate.

The use of a photo eye to sense the width change on the continuous web portion in the order change region and the ability to synchronize the knife to cut on this width change position solves the problem of order change segment scrap not being of the width or length to go out onto the top of the stack on that level. The ability to synchronize the partial web sever position to the end of the order on that web with the partial web sever creates sheets of the same width and length on that level. The order change segment waste will therefore fit onto the top of the old order stack and at the bottom of the new order stack with scrap being of equal or less length and equal width of all outs being slit. There are no diagonal pieces, no small scrap pieces, and no over-width or over-length pieces than can cause jam-ups in the stacker or knife.

The invention as described can also be applied to solving the problem of ill-conditioned scrap associated with the center lateral cut implementation of U.S. Pat. No. 5,496,431. With the order change strategy described in that patent, webs going to both the upper and lower knife levels are continuous webs. At the order change region, there can be, and typically is, a change in the width and number of outs going to both knife levels. With the present invention, the lateral cut is synchronized with the last cut in the order of either the upper or lower knife level to place it so that it lies within a distance greater than, or equal to, the maximum reaction of the cutoff knife profile controller from the end of the order. This insures that a high-speed photo eye, prepositioned cross-corrugator so as to sense the web width change portion created by the center lateral cut, is able to provide a signal to the knife controller that allows the knife to cut on top of the center lateral cut to within very close accuracy.

Having determined that the center lateral cut will be so positioned, the actual position of the center lateral cut will then be chosen to either correspond to the exact end of the order of the alternative upper or lower web level or to a position upstream so that a high-speed photo eye that is pre-positioned cross-corrugator to sense the web width change position created by the center lateral cut on this web level is able to provide a signal to the knife controller that allows this knife level to also cut on the center lateral cut to within very close accuracy.

This strategy of placing the location of the center lateral cut by synchronizing it to the cutoff knife cuts and then subsequently sensing the web width changes in the upper and lower knife level webs to cut uniquely on the center lateral cut with the cutoff knife on both levels of web allows the scrap created in the order change region to be of the same width and number of outs so that all scrap can fit on top of the stack without jam-up.

The basic method of the present invention is applicable to a corrugator dry end in which a gapless order change is effected through the use of a plunge-type slitter-scorer. In such a corrugator, the conventional components include a slitter-scorer that is operable to provide longitudinal slit lines and score lines in a continuous corrugated paperboard web as it passes through the slitter-scorer. The slit lines divide the web into a plurality of output webs of selected widths. A pair of vertically separated cut-off knives down-stream of the slitter-scorer receive the output webs and cut them into sheets of selected lengths. The knives typically include an upper knife and a lower knife, upstream of which is positioned a web selector device to selectively separate the output webs along a common innermost slit line into an upper output web portion and a lower output web portion for the respective upper and lower knives. The present invention, performed on a corrugator of the foregoing type, includes the steps of (1) determining an order change location in the web that defines the transition from a running (or old) order to a new order of a selected one of the upper and lower output web portions, (2) partially severing the web upstream of the web selector device to provide a generally transverse slit at the order change location, the transverse slit being positioned such that it will connect the common innermost slit line of the running order web portions and the common innermost slit line of the new order web portions as those slit lines are subsequently made downstream, (3) adjusting the slitter-scorer in an order change region of the web that includes the order change location to terminate the running order slit and score lines and to begin the new order slit and score lines, (4) after separating the output web portions, sensing a transverse edge of a web portion defined by the transverse slit and generating an edge location signal, and (5) operating one of the cut-off knives in response to the traverse edge location signal to cut one of the web portions on the line of the transverse slit.

When the method of the present invention is applied to an order change strategy described in U.S. Pat. No. 6,137,381, the step of partially severing the web comprises slitting the web from one edge to the farthest of the common innermost slit lines. The sensing step comprises sensing the transverse edge of the output web portion associated with the unslit edge of the web. The method may include the step of slitting the web from the edge nearest to said farthest of the common innermost slit lines. The step of partially severing the web preferably comprises slitting the web from the edge of the web containing the narrower of the upper and lower output web portions of the running order and new order output webs. In the preferred embodiment of this method, the sensing step comprises (1) mounting a laterally positionable sensor adjacent each upper and lower output web portion upstream of each respective knife, and (2) positioning the sensor between the innermost slit line of the selected running order and new order web portions. The mounting step preferably comprises mounting the sensor at a distance upstream of the respective knife at least as great as a distance comprising the product of a knife reaction time and a web speed.

When applied to an order change system of the type described in U.S. Pat. No. 5,496,431, the step of partially severing the web comprises slitting the web intermediate the opposite edges of the web. This method also preferably includes the steps of (1) sensing a transverse edge of the other web portion defined by the transverse slit and generating a second edge location signal, and (2) operating the other cut-off knife in response to said second edge location signal to cut the other web portion on the line of the transverse slit.

In accordance with a modified method for minimizing scrap in a gapless order change for a corrugator of the type described above, the method is particularly adapted to take into consideration the minimum length of sheets that the knives are capable of cutting and includes the steps of (1) determining an order change region in the web that defines the transition from a running order to a new order in which the common slit line separating running order upper and lower output web portions is offset laterally from the common slit line separating the new order upper and lower output web portions, (2) determining an order change location in the order change region for the last knife cut for each of the running order upper and lower output web portions, (3) partially severing the web upstream of the web selector device to provide a generally transverse slit in the order change region and at the order change location or upstream of the order change location by a distance at least equal to the minimum sheet length to subsequently connect the common slit line of the running order web portions and the common slit line of the new order web portions, (4) adjusting the slitter-scorer in the order change region to terminate the running order slit end score lines and to begin the new order slit and score lines, (5) after separating the output web portions, sensing a transverse edge of one of the output web portions defined by the transverse slit and generating an edge location signal, and (6) operating one of the cut-off knives in response to the edge location signal to cut an output web portion on the line of the transverse slit.

DETAILED DESCRIPTION OF THE PREFERRED EMBODIMENTS

Figure 1:
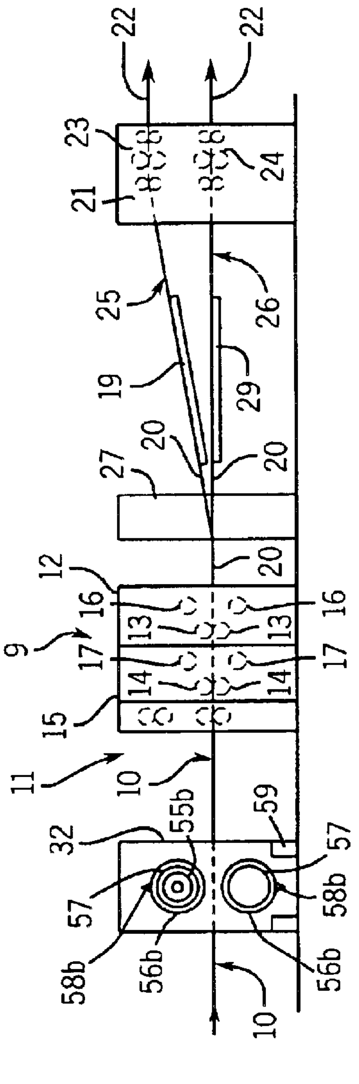
FIG. 1 is a schematic side elevation of a corrugator dry end modified to incorporate the apparatus and to practice the method of the present invention.

Referring to FIG. 1, a continuous corrugated paperboard web 10 enters a corrugator dry end 11 from an upstream wet end (not shown) where the component webs are processed, glued together and cured for dry end processing. The dry end system shown is adapted to process order changes by using a gapless plunge type system of the present invention. While an order is running, the continuous web 10 passes through a slitter-scorer station 9, including a slitting station 12 having two pairs of upper and lower slitting tools 13 and 16, and a scoring station 15 having two pairs of scoring tools 14 and 17. However, only one pair of slitting tools 13 and one pair of scoring tools 14 is in operative engagement with the web 10 while the order is being run, except for a brief period of overlap during order change. The other pairs of slitting tools 16 and scoring tools 17 are inoperative and, as shown, are withdrawn from operative contact with the web. In the slitting station 12 and the scoring station 15, the web 10 is provided with longitudinal score lines (not shown) and longitudinal slit lines 18, which are shown schematically in various order patterns in the webs of FIGS. 2, 4–7, 9 and 10. The continuous longitudinal slits 18 define a series of output webs or outs 20 which continue downstream into a cut-off knife 21 where the webs are cut into selected length sheets 22. The sheets 22 are conveyed downstream into a stacker (not shown) or other suitable collecting device.

Figure 2:
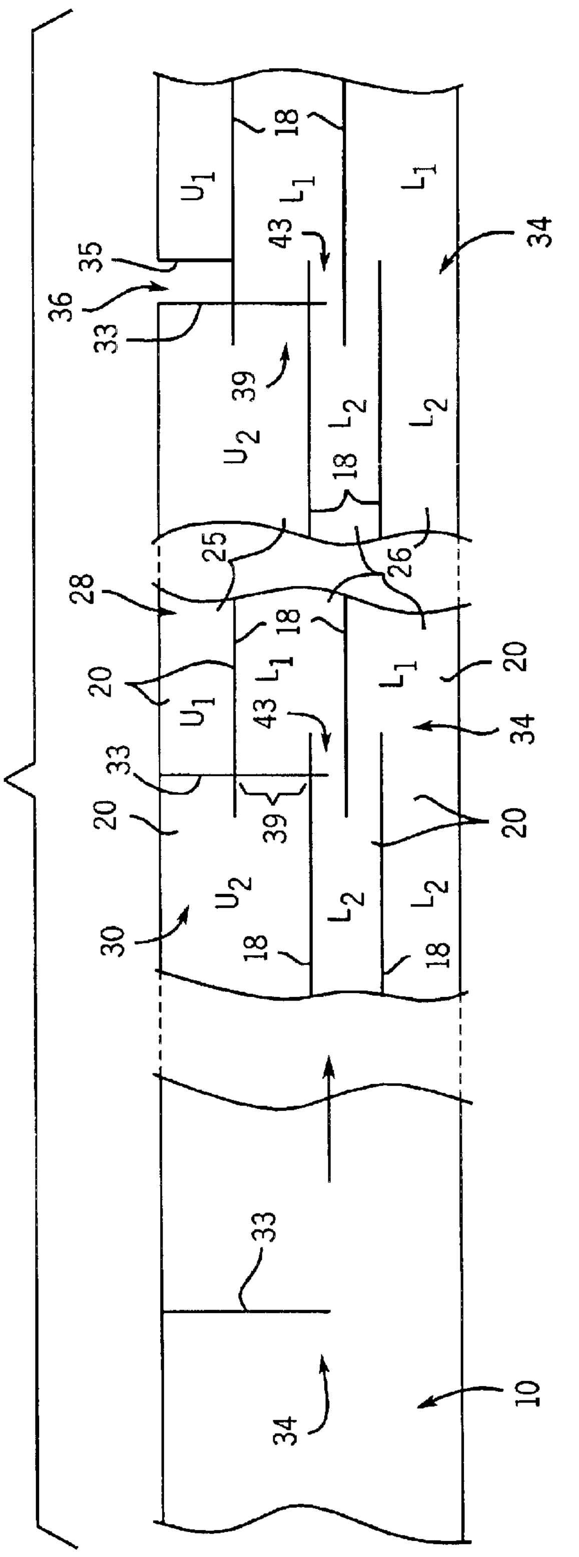
FIG. 2 is a schematic top plan view showing the order change sequence in a traveling paperboard web processed by the apparatus and method of the present invention.

In the system shown in FIG. 1, a two level or duplex cut-off knife 21 includes an upper cut-off knife 23 and a lower cut-off knife 24. Each of the knives 23 and 24 is capable of processing any arrangement of outs 20 up to the full width of the web 10. However, two cut-off knives are typically utilized to enable two independent sheet orders to be processed simultaneously, where the sheet lengths and widths may vary considerably between running orders. Thus, one set of upper output web portions 25 is directed to the upper cut-off knife 23 and a set of lower output web portions 26 is directed into the lower cut-off knife 24. The output webs 20 exiting the slitter-scorer station 9 are separated vertically in a web selecting device 27 in which selectively positionable forks in an array extending across the full width of the web 10 are positioned to direct the respective upper and lower output web portions 25 and 26 to the correct cut-off knife 23 or 24. The forks in the web selector 27 are thus selectively positioned to direct the respective output web portions 25 and 26 onto upper and lower slider tables 19 and 29 which support the outs and direct them into their respective knives 23 and 24. In FIG. 2, for example, the current running order 28 is comprised of a single upper output web 25 also identified as $U_1$ and a pair of lower output webs 26, each identified as $L_1$. Furthermore, the FIG. 2 example shows that an order change will result in an immediately following new order 30 comprising a single upper output web $U_2$, substantially wider than running order output web $U_1$, and a pair of lower output webs $L_2$, each narrower in width than either of the running order lower output webs $L_1$.

Figure 3A:
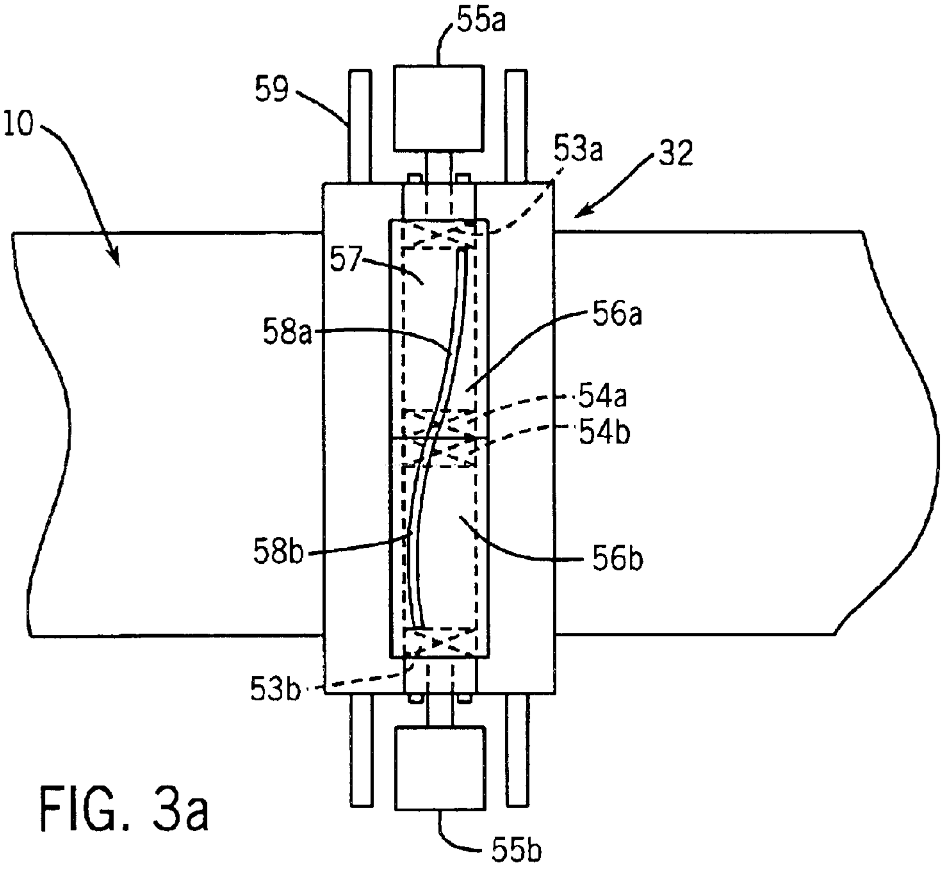
FIG. 3 is a plan view of a rotary shear apparatus specially adapted for use with the method of the present invention.
Figure 3B:
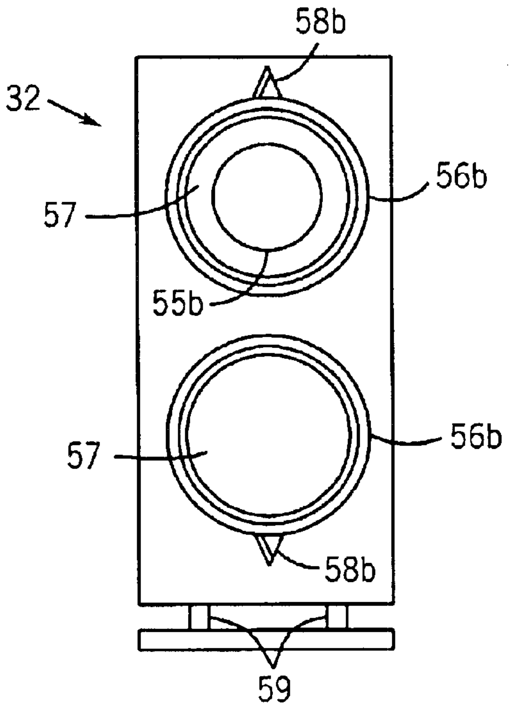

In the schematic system shown in FIG. 1, an upstream rotary shear 32 is shown for use in a gap-type order change or a plunge style order change system. Shear 32 incorporates a unique construction and, as schematically shown in FIGS. 3*a* and 3*b*, is comprised of upper and lower solid non-rotating center shafts 57, around which two pairs of upper and lower cylindrical shells 56*a* and 56*b* are rotatably carried. Thus, each cylindrical shell 56*a* or 56*b*, coaxially mounted on one shaft 57, is carried by an outer bearing 53*a* or 53*b* and an inner bearing 54*a* or 54*b*. In this manner, each cylindrical shell 56*a* and 56*b* can be rotated independently of the other. The axial space between adjacent cylindrical roll shells 56*a* and 56*b* can be made very small, i.e. 0.0125 inch (3 mm) or less. Separate motors 55*a* and 55*b* drive respective shell pairs 56*a* and 56*b*. The shell pairs 56*a* and 56*b* are provided with helical knife blades 58*a* and 58*b*, respectively, to partially or fully sever the web 10 running through the shear 32. Motors 55*a* and 55*b* can be electrically timed and servo-controlled so that both cylinder pairs 56*a* and 56*b* can be powered to completely sever web 10 across its full width for a gap-type order change. Alternately, control signals can be generated to activate only motor 55*a* operating upper and lower cylinder pair 56*a* or motor 55*b* operating upper and lower cylinder pair 56*b* to create a partial web sever in the form of the transverse slit 33 shown in FIG. 2. The sum of the cross machine width of shear cylinders 56*a* and 56*b* is wider than web 10 and, preferably, the shear 32 can be side shifted on tracks 59 so that the transverse slit (e.g. 33) can be made slightly more than half the width of web 10. The space between cylinder shells 56*a* and 56*b* can be directly aligned from the upper knife to the lower, or axially offset. Also, the cylinder pair 56*a* and 56*b* could be locked together for simultaneous cutting either electrically by synchronizing the servomotor drives or by selectively mechanically locking the cylinders together (and using a single motor 55). By using two motors, a partial web sever could be effected on either side of the shear. Using one motor, allows a partial sever to be made on only the driven side of the shear. The knife blade pairs 58*a* and 58*b* may be provided with continuous cutting edges or may comprise serrated blades.

In an alternate arrangement, two rotary shears (not shown), each capable of cutting in from an opposite edge of the web by slightly more than half the width of the web, could be used to create a partial web sever from either side of the web. Such separate shears would be located offset from each other in the direction of web travel. The transverse slit 33 of FIG. 2 defines the approximate longitudinal center of an order change region 34 where the slitting and scoring tools 13 and 14 operating on the running order 28 are retracted and the slitting and scoring tools 16 and 17, preset to handle the new order 30, are "plunged" into operative engagement with the web 10. Thus, as shown in the center transitional view in FIG. 2, the order change region 34, carrying the transverse slit 33, exits the slitter-scorer with overlapping slit lines 18 from the running order 28 and the new order 30. This region will also include overlapping score lines (not shown) from the running and new orders.

The substantial increase in width of the upper output web $U_2$ in the new order 30 from the upper output web $U_1$ of the running order 28 requires that a portion 39 of the width of the immediately adjacent output web $L_1$ of the running order 28 be diverted from the lower knife level 24 to the upper knife level 23 in order to effect the order change. The transverse slit 33 provides a break in the web 10 which allows the selector forks in the web selecting device 27 to be repositioned to redirect the web portion 39 defining the transition from running order web $L_1$ to new order web $L_2$ However, a portion 43 of innermost running order web $L_1$ is not severed by the transverse slit 33 and is connected to the innermost output web $L_2$ of the new order 30. The order change is, therefore, effected at the slitter-scorer with no gap and with a continuous web (output web portions $L_1$ and $L_2$) into the lower cut-off knife 24.

Figure 4:
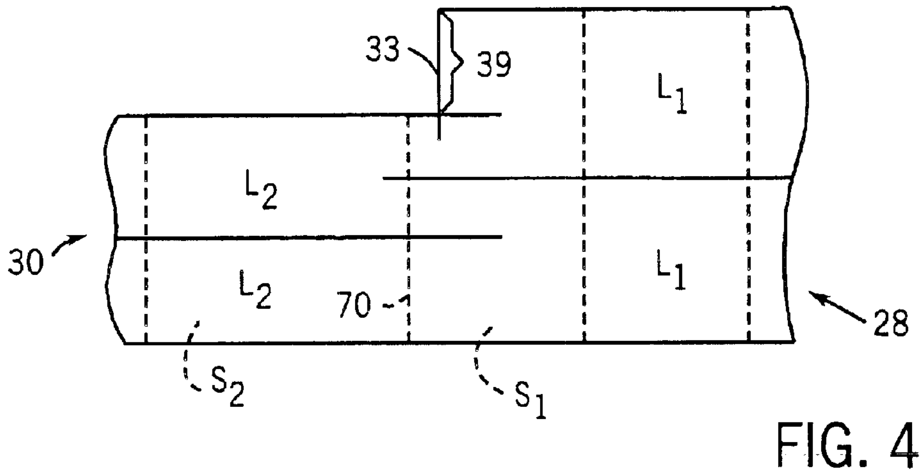
FIGS. 4–6 are schematic top plan views of end of order knife cut strategies for the lower output web portions of the order change sequence shown in FIG. 2.
Figure 5:
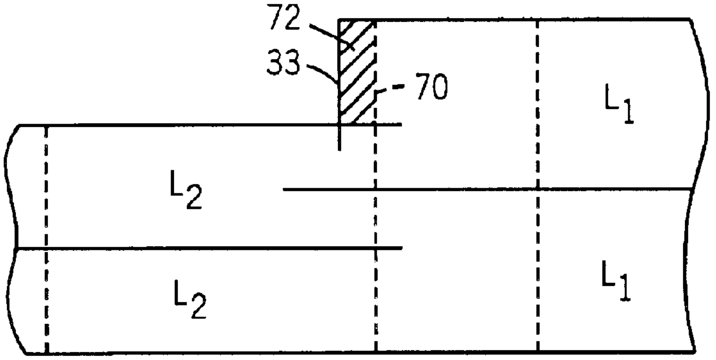
Figure 6:
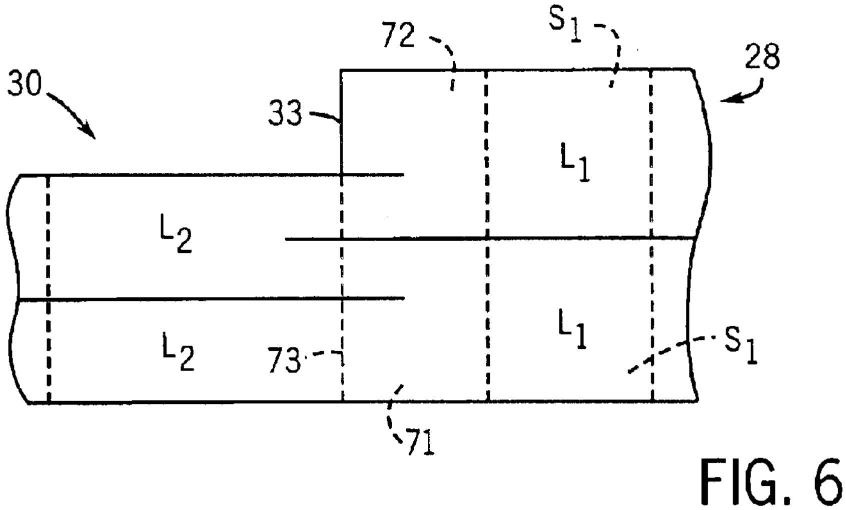

In the righthandmost transitional view of FIG. 2, the transverse slit 33 may be synchronized exactly with the end of the running order 28 such that the tailout end 35 of running order output web $U_1$ coincides with the slit 33. A gap 36 between the transverse slit 33 and the tailout end 35 is formed as web $U_1$ accelerates away from web $U_2$ as a result of the overspeed of the pull roll at downstream knife 23. However, because it will normally not be possible to also attain exact synchronization of the transverse slit 33 and the subsequent knife cut defining the end of the order for the lower output webs $L_1$, an alternate end of order knife cut strategy needs to be considered. This is shown in FIGS. 4, 5 and 6 which are taken from FIG. 2, but show only the lower output web portions $L_1$ and $L_2$ of the running and new orders 28 and 30, respectively. In these figures, the running order and new order sheet lengths provided by the downstream lower cutoff knife 24, are defined by the transverse dash lines and are designated, respectively, $S_1$ and $S_2$. It is important to assure that the end of order knife cut 70 (defining the transition from sheets $S_1$ to $S_2$) is biased to assure that it occurs upstream of the transverse slit 33. This is shown in FIG. 4. Otherwise, if the knife cut defining the tailout end of running order webs $L_1$ is biased to the downstream side of slit 33, as shown in FIG. 5, a short scrap piece 72 would be cut in the tail of the innermost output web portion $L_1$ of the running order that could result in a jam-up.

Figure 7A:
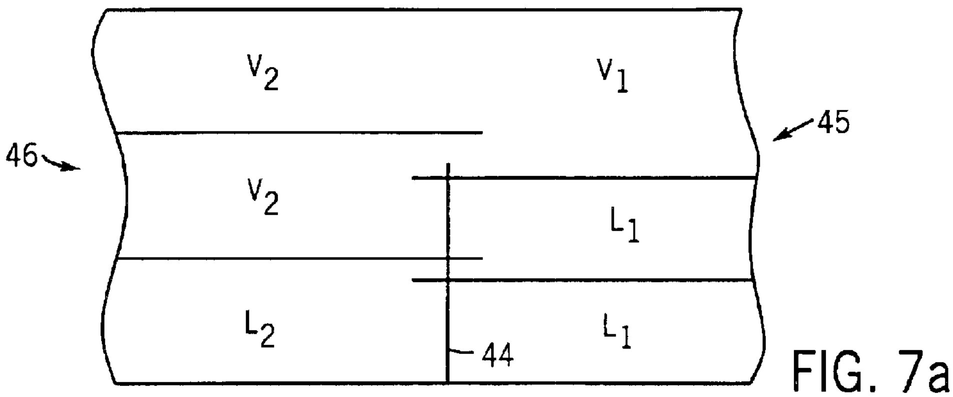
FIGS. 7*a*–7*d* are schematic top plan views showing a modified order change sequence in which the partial web sever is made from the opposite edge of the web including the outs associated with the bottom level knife.
Figure 7B:
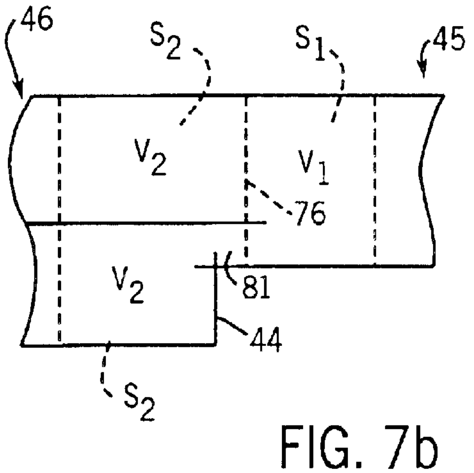
Figure 7C:
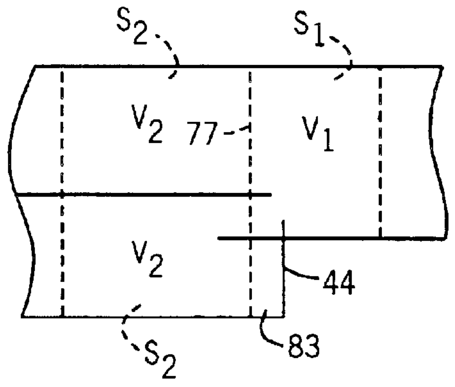
Figure 7D:
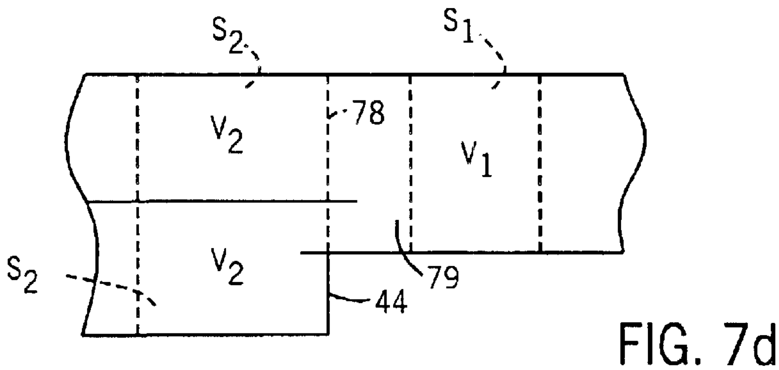

Depending upon the relative widths and numbers of outs in the running and new orders, scrap pieces or ill-conditioned leading edges of new order pieces can be created that jam the knives or the downstacker during the order change process. For example, FIG. 7*a* shows an order with a single output web $U_1$ to the upper level knife 23 and two output web portions $L_1$ to the lower level knife 24 on the running order 45. Correspondingly, there are two output web portions $U_2$ to the upper level knife and one output web portion $L_2$ to the lower level knife on the new order 46. In this example, the partial web sever provided by transverse slit 44 is taken in a manner to completely sever the lower output web portions $L_1$ while leaving a continuous web directed to the knife in the upper level. FIGS. 7*b*–7*d* show only the upper output web portions $U_1$ and $U_2$ of the running new orders, respectively. In these Figures, the running order and the new order sheet lengths, provided by the downstream upper cutoff knife 23, are defined by transverse lines and are designated, respectively, $S_1$ and $S_2$. In FIG. 7*b*, the end of order knife cut 76 occurs downstream of the transverse slit 44. The first sheet $S_2$ in the new order 46 located at the innermost position in the new order output web portion $U_2$, has a protuberance 81 that may cause this sheet $S_2$ to skew when it hits the back stop of the stacker, causing a stacker jam-up. In FIG. 7*c*, the end of order knife cut 77 occurs upstream of the transverse slit 44. Knife cut 77 creates a small piece 83 which will go into the stacker with the last sheet $S_1$ of the running order output web $U_1$. Since there is no stack onto which this small piece 83 can be stacked in the downstacker, it will drift down alongside the stack of sheets $S_1$ into the stacker lift, become wedged between the lift rollers and cause a jam-up. Alternately, small piece 83 could jam-up in the cutoff knife 23.

As illustrated by the foregoing examples, there is a high potential for jam-up if the last cut in the running order on the continuous web portion U of the order change either leads or lags the partial web sever defined by the transverse slit 44. These problems are alleviated by synchronizing the last cut in the running order $U_1$ with the partial web sever transverse slit 44.

Referring again to FIG. 6 which shows the end of order transition between the lower output web portions $L_1$ and $L_2$ in FIG. 2, the last cut 73 in the running order $L_1$ is synchronized with transverse slit 33, resulting in scrap pieces 71 and 72 that are slit to the exact width of running order sheets $S_1$ and are of a length shorter than running order sheets $S_1$, so that they fit onto the top of the stacks created in the downstacker.

Comparing the foregoing end of order synchronization with that described above for the order change problems described with respect to FIGS. 7*b* and 7*c*, FIG. 7*d* shows an end of order synchronization in accordance with the present invention. In FIG. 7*d*, running order last cut 78 is synchronized with transverse slit 44, resulting in a scrap piece 79 that is slit to the exact width of the running order sheets $S_1$ in the upper output web portion $U_1$ and cut to a length shorter than running order sheets $S_1$, so that it will fit onto the top of the stack in the downstacker. New order sheets $S_2$ are also cut squarely so that they will fit against the downstacker backstop without skewing (as would occur in the FIG. 7*b* situation previously described).

Figure 8:
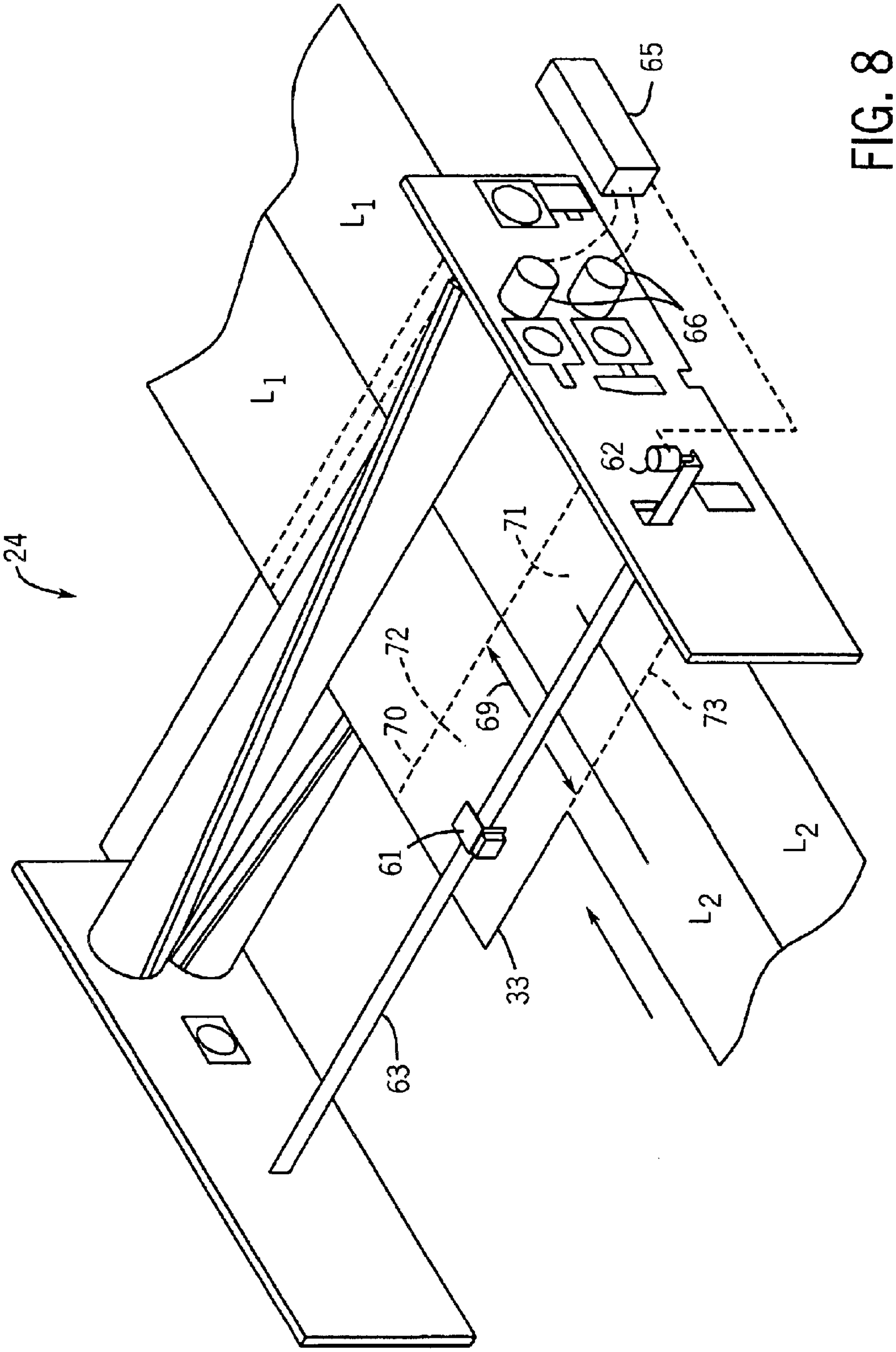
FIG. 8 is a perspective view of the lower level knife 24 shown in FIG. 1, including the photo eye detection system used to provide the synchronized order change strategy of the present invention.

The apparatus required to synchronize the last cut 78 in FIG. 7*d* or 73 in FIG. 6 with the transverse slit 44 or 33, respectively, defining the order change location is a high speed photocell 61 shown in FIG. 8. The description of the FIG. 8 apparatus which follows will utilize the order change scheme shown in FIG. 6 wherein the lower output web portions $L_1$ and $L_2$ are directed to the lower cutoff knife 24. The high speed photocell 61 is mounted on a transverse positioning track 63 in knife 24 (it being understood that an identical photocell system may also be mounted on upper cutoff knife 23 for use when the last order change cut is effected at that level). The photocell 61 is moved prior to order change by a positioning motor 62 to a transverse position along track 63 such that it can detect an edge of the web defined by the transverse slit 33 which defines a transition from board to no board (or in the FIG. 7*d* order change scheme, from no board to board) as the order change region progresses through the cutoff knife. The cutoff knife controller 65 receives an input signal from high speed photocell 61 and causes a change in the profile control outputs to knife motor 66 such that the knife cuts on line 73 exactly coincident with the transverse slit 33. A problem associated with controlling the knife to cut precisely on transverse slit 33 is that there must be a minimum distance 69 between the next-to-last sheet cut 70 and the last sheet cut 73, so that the knife can react quickly enough to synchronize the cut 73 with transverse slit 33.

Figure 9:
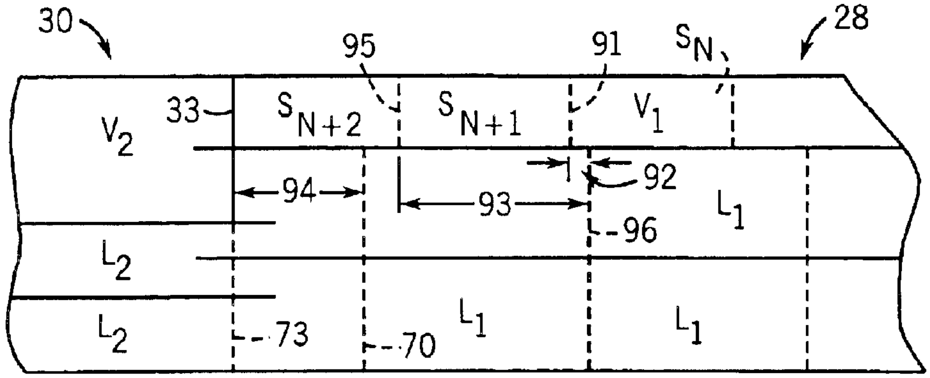
FIG. 9 is a schematic top plan view of the order change shown in FIG. 2 illustrating system adjustments made to modify the end of order cuts to accommodate the minimum sheet length cut capability of the knives.

To ensure that this synchronization is possible, it is necessary to place transverse slit 33 relative to the second-to-last cut 70 by having the system controller 65 "look ahead" in the order as shown in FIG. 9. FIG. 9 shows phantom cut lines associated with the running order 28 for the upper output web portion $U_1$ and the lower output web portions $L_1$ as they will subsequently occur in the respective cutoff knives 23 and 24 as the end of the order approaches the knives. In FIG. 9, cut line 91 defines the nominal order end based on the requirement to make N cuts ($S_N$ sheets) in upper level output web portion $U_1$. If the transverse slit 33 had been placed to coincident with cut line 91, then the distance from the next-to-last sheet cut 96 on the lower output webs $L_1$ and the last sheet cut 91 on the upper output web $U_1$ would have been distance 92. This distance is too small to have allowed the lower level knife 24 to react quickly enough to a signal from photocell 61 to cut on cut line 91. To provide adequate reaction time, the transverse slit 33 could be placed to coincide with upper order cut line 95 in which case the upper level running order would be overrun by one sheet $S_{N+1}$. In that case, the distance from the next-to-last cut line 96 to the last cut line 95 would be distance 93, nearly a full sheet length $L_1$ on the lower level running order. Over running the order by a second sheet $S_{N+2}$ would place the transverse slit 33, as shown in FIG. 9, with a distance between the next-to-last cut line 70 and the transverse slit 33 equal to the length 94. This length would exceed that required for the reaction time of lower cutoff knife 24 to respond to sensing an edge of the web defined by transverse slit line 33 by the high speed photocell 61, so that the final cut 73 on the lower level running order web could be placed to coincide with the transverse slit 33. Length 94 would also be substantially less than length 93 and would be chosen to minimize the length of the last sheets, which constitute waste sheets, in lower level running order $L_1$.

Other criteria could be used for choosing placement of the transverse slit line 33 relative to the phantom cut lines shown in FIG. 9 of the running upper and lower output web portions $U_1$ and $L_1$, if such criteria are consistent with the overall objective of insuring that the high speed photocell 61 can sense the web width change (e.g. at 33 in FIG. 8) between the running and new orders and subsequently cause the last cut 73 on the continuous web portion $L_1$ of the order to be coincident with the transverse slit line 33 defining the order change location so that all waste sheets at the end of the order are slit to the width of the running order such that jam-ups due to waste sheets at order change are eliminated and that the length of these waste sheets is minimized.

Figure 10A:
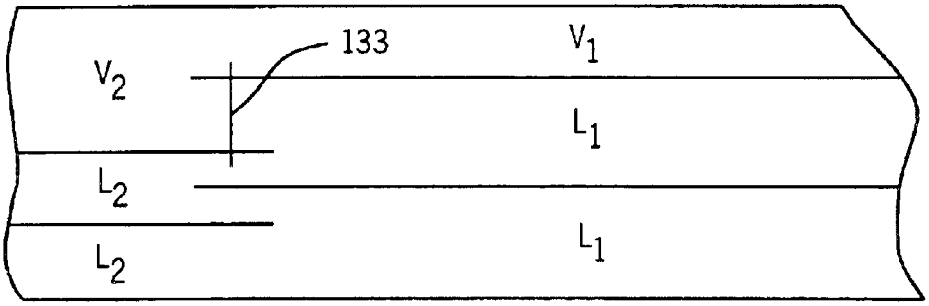
FIGS. 10*a* and 10*b* show an order change strategy similar to FIG. 2, but with a modified transverse slit provided in accordance with the teaching of another prior art method.
Figure 10B:
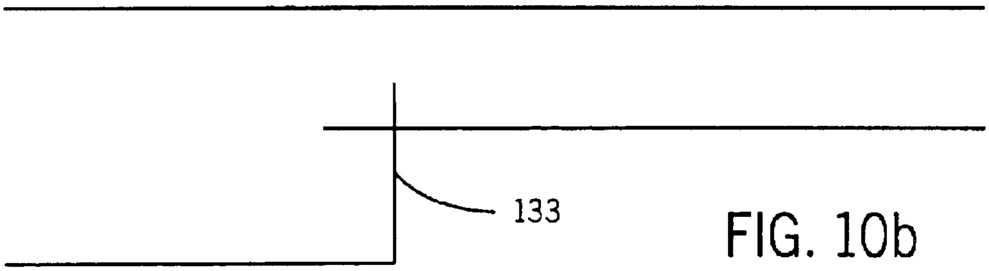

The apparatus and methods described herein for minimizing waste at order change and avoiding odd shaped or small size scrape pieces that can cause jam-up at order change applies as well to order changes made using the methods described in U.S. Pat. No. 5,496,431. The order change pattern of FIG. 2 is shown in FIGS. 10*a* and 10*b* with a transverse slit 133 placed in the interior of the order change region as taught in the above identified patent. With this order change strategy, both upper and lower output web portions U and L are continuously threaded up to their respective upper and lower knife levels. The web directed to the lower knife level would look exactly as that shown in FIGS. 4, 5 and 6. Placement of the transverse slit relative to the phantom cut lines in the running order web portions would be accomplished in the same manner described for placement of transverse slit lines 33 or 44 described above. For this embodiment of the invention, a high speed photo cell similar to photocell 61 in FIG. 8 would also be located in the upper level knife 23. This photocell would be positioned transversely across the knife to sense the web width discontinuity created by transverse slit 133 at the order change location as shown in FIG. 10*b*. The transverse slit would normally (but not necessarily) be placed coincident with the last cut in the upper level running order $U_1$. That being the case, the knife would have reaction time to respond to the web width transition detected by the high speed photocell and cause the last cut of the running order to be placed coincident with the transverse slit 133. This would ensure that there were no small pieces that were outside the width of the running order that could cause knife or stacker jam-up.

We claim:

1. A method for minimizing scrap in a gapless order change for a corrugator, said corrugator including a slitter-scorer operable to provide longitudinal slit lines and score lines in a continuous corrugated paperboard web passing through the slitter-scorer, the slit lines dividing the web into a plurality of output webs of selected widths, a pair of vertically separated cut-off knives downstream of the slitter-scorer for receiving and cutting the output webs into selected sheet lengths, said knives including an upper knife and a lower knife, and a web selector device between the slitter-scorer and the cut-off knives for selectively separating the output webs along a common innermost slit line into an upper output web portion and a lower output web portion for said respective upper knife and lower knife, said method comprising the steps of:

(1) determining an order change location in the web defining the transition from a running order to a new order of a selected one of the upper and lower output web portions;

(2) partially severing the web upstream of the web selector device to provide a generally transverse slit at the order change location to subsequently connect the common innermost slit line of the running order web portions and the common innermost slit line of the new order output web portions;

(3) adjusting the slitter-scorer in an order change region of the web that includes the order change location to terminate the running order slit and score lines and to begin the new order slit and score lines;

(4) after separating the output web portions, sensing a transverse edge of a web portion defined by said transverse slit and generating an edge location signal; and, (5) operating one of the cut-off knives in response to said transverse edge location signal to cut one of the web portions on the line of said transverse slit.

2. The method as set forth in claim 1 wherein said step of partially severing the web comprises slitting the web from one edge to the farthest of the common innermost slit lines.

3. The method as set forth in claim 2 wherein said sensing step comprises sensing the transverse edge of the output web portion associated with the unslit edge of the web.

4. The method as set forth in claim 2 comprising the step of slitting the web from the edge nearest to said farthest of the common innermost slit lines.

5. The method as set forth in claim 1 wherein said step of partially severing the web comprises slitting the web from the edge of the web containing the narrower of the upper and lower output web portions of the running order and new order output webs.

6. The method as set forth in claim 1 wherein said sensing step comprises:

(1) mounting a laterally positionable sensor adjacent each upper and lower output web portion upstream of each respective knife; and, (2) positioning the sensor between the innermost slit line of the selected running order and new order web portions.

7. The method as set forth in claim 6 including the step of mounting the sensor a distance upstream of the respective knife at least as great as a distance comprising the product of a knife reaction time and a web speed.

8. The method as set forth in claim 1 wherein the step of partially severing the web comprises slitting the web intermediate the opposite edges of the web.

9. The method as set forth in claim 8 including the steps of:

(1) sensing a transverse edge of the other web portion defined by said transverse slit and generating a second edge location signal; and, (2) operating the other cut-off knife in response to said second edge location signal to cut said other web portion on the line of said transverse slit.

10. A method for minimizing scrap in a gapless order change for a corrugator, said corrugator including a slitter-scorer operable to provide longitudinal slit lines and score lines in a continuous corrugated paperboard web passing through the slitter-scorer, the slit lines dividing the web into a plurality of output webs of selected widths, a pair of vertically separated cut-off knives downstream of the slitter-scorer for receiving and cutting the output webs into selected sheet lengths, said knives including an upper knife and a lower knife each having a minimum sheet length cut capability, and a web selector device between the slitter-scorer and the cut-off knives for selectively separating the output webs along a common innermost slit line into an upper output web portion and a lower output web portion for said respective upper knife and lower knife, said method comprising the steps of:

(1) determining an order change region in the web defining the transition from a running order to a new order in which the common slit line separating the running order upper and lower output web portions is offset laterally from the common slit line separating the new order upper and lower output web portions;

(2) determining an order change location in said order change region for the last knife cut for each of the running order upper and lower output web portions;

(3) partially severing the web upstream of the web selector device to provide a generally transverse slit in the order change region and at the order change location or upstream of the order change location by a distance at least equal to said minimum sheet length to subsequently connect the common slit line of the running order web portions and the common slit line of the new order output web portions;

(4) adjusting the slitter-scorer in the order change region of the web to terminate the running order slit and score lines and to begin the new order slit and score lines;

(5) after separating the output web portions, sensing a transverse edge of one of the output web portions defined by said transverse slit and generating an edge location signal; and, (6) operating one of the cut-off knives in response to said edge location signal to cut an output web portion on the line of said transverse slit.

11. The method as set forth in claim 10 wherein said step of partially severing the web comprises slitting the web from one edge to the farthest of the common slit lines.

12. The method as set forth in claim 11 wherein said sensing step comprises sensing the transverse edge of the output web portion associated with the unslit edge of the web.

13. The method as set forth in claim 11 comprising the step of slitting the web from the edge nearest to said farthest of the common slit lines.

14. The method as set forth in claim 10 wherein said step of partially severing the web comprises slitting the web from the edge of the web containing the narrower of the upper and lower output web portions of the running order and new order output webs.

15. The method as set forth in claim 12 wherein said sensing step comprises:

(1) mounting a laterally positionable sensor adjacent the unslit output web portion upstream of the knife associated with said unslit web portion; and, (2) positioning the sensor between the innermost slit line of the selected running order and new order web portions.

16. The method as set forth in claim 15 including the step of mounting the sensor a distance upstream of the respective knife at least as great as a distance comprising the product of a knife reaction time and a web speed.

* * * * *